(No Model.)

B. F. TREKELL.
VELOCIPEDE.

No. 265,996. Patented Oct. 17, 1882.

WITNESSES
P. B. Turpin
T. N. Griffin

INVENTOR
Benjamin F. Trekell
By R. S. & A. P. Lacey
ATTORNEY'S.

N. PETERS, Photo-Lithographer, Washington, D. C.

UNITED STATES PATENT OFFICE.

BENJAMIN F. TREKELL, OF MOUNT PLEASANT, IOWA.

VELOCIPEDE.

SPECIFICATION forming part of Letters Patent No. 265,996, dated October 17, 1882.

Application filed April 29, 1882. (No model.)

*To all whom it may concern:*

Be it known that I, BENJAMIN F. TREKELL, of Mount Pleasant, in the county of Henry and State of Iowa, have invented certain new and useful Improvements in Velocipedes, (name of conveyance "Lightning Velocipede;") and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to improvements in tricycle-velocipedes.

It consists in the construction, combination, and arrangement of the several parts, as will be hereinafter fully described.

Figure 1:
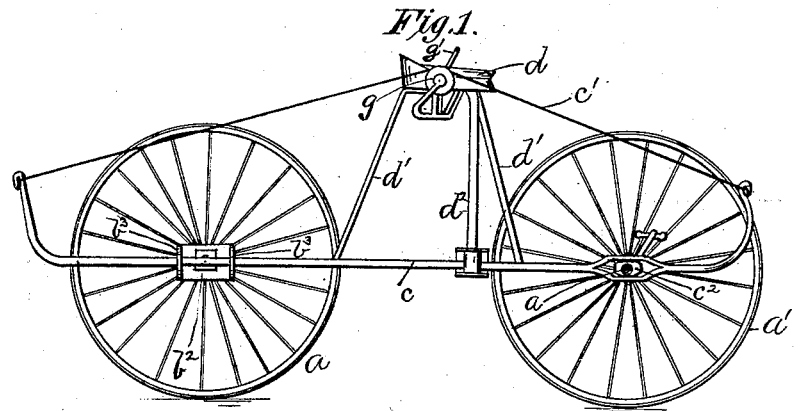
Figure 2:
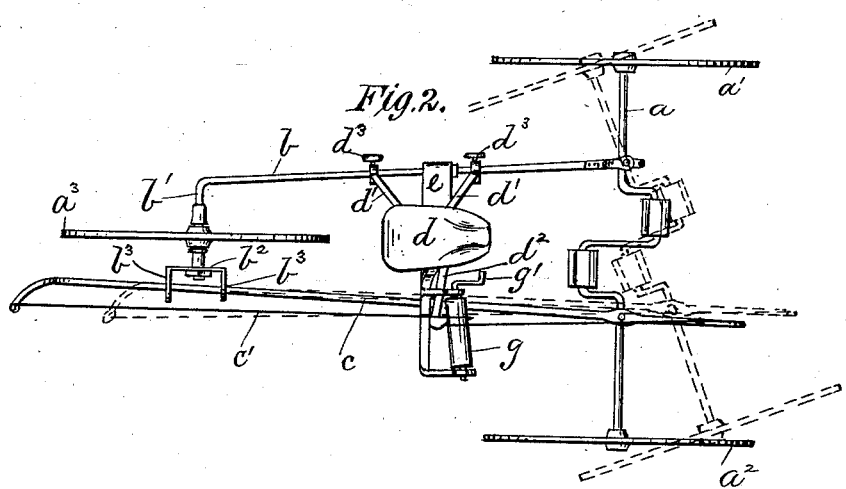
Figure 3:
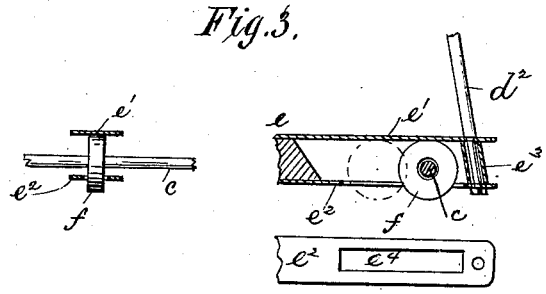

In the drawings, Figure 1 is a side view with one of the wheels removed. Fig. 2 is a plan view; and Fig. 3 shows in detail some of the parts, as will be described.

$a$ is the main axle, formed with double cranks provided with treads of ordinary construction. $a'$ $a^2$ are the front wheels. The wheel $a'$ is keyed to the axle $a$, and the wheel $a^2$ is spindled on the opposite end of the said axle.

$b$ is one of the side bars. Its forward end is preferably bifurcated, and between the arms so formed I pivot the journal-bearing for the axle. This bearing is secured in place on the axle by constructing the axle smaller at point of journal, with shoulders on either side to secure the bearing, or in any other suitable manner desired. Thus it will be seen the bar $b$ has practically the axle journaled in its forward end, while it is capable of a lateral movement, necessary in the steering of the velocipede, as will be described.

$b'$ is a rod bent from rear end of rod $b$ at nearly a right angle thereto. The rear wheel, $a^3$, is spindled on this rod.

$b^2$ is a bracket secured on end of rod $b'$. Its arms $b^3$ are extended outward parallel with each other and the bar $b'$, and through them I form openings, in which rests and through which slides the rear portion of steering side bar, $c$, hereinafter described.

$c$ is the steering side bar. Its ends are bent upward and provided with eyes or hooks to provide means for securing thereto the cord $c'$, which is secured to each end of bar $c$, as shown, and extended up over an operating-windlass, as will be described. I preferably split the forward part of bar $c$ near point where end is bent up, and form a slot within which I pivot the journal-bearing block $c^2$, which is secured from sliding along the axle in any suitable manner desired. The rear portion of bar $c$ rests and slides in openings through bars $b^3$ of bracket $b^2$, as shown. It will be seen, therefore, that by moving the bar $c$ backward or forward, which I accomplish by mechanism hereinafter described, the direction of the axle $a$ and wheels $a'$ $a^2$ will be changed, as indicated in dotted lines, Fig. 2.

$d$ is the seat. It is supported on standards $d'$ $d'$ and $d^2$. The standards $d'$ are arranged one in rear of the other and have eyes on their lower ends, through which is passed the rod $b$. $d^3$ are thumb-screws passed through one side of the eyes on standards $d'$, and arranged to bear against the rod $b$ and secure the seat to or away from the forward axle to adjust the machine to a short or long stroke, as is desired. The standard $d^2$ is secured at its lower end to the outer end of the beam $e$, hereinafter described.

$e$ is a beam having one end journaled on rod $b$ and its opposite end bifurcated, forming the bars $e'$ $e^2$. The standard $d^2$, as shown in Fig. 3, is extended down through the upper bar and secured to the lower bar, and around the standard, between the bars $e'$ $e^2$, I place a sleeve, $e^3$, adapted to serve as a brace to keep the bars $e'$ $e^2$ from being pressed together. The bar $c$ passes through between the sleeve $e^3$ and the main portion of the beam. The bottom plate, $e^2$, is formed with a slot, $e^4$, through which projects the lower end of roller $f$, hereinafter described.

$f$ is a roller journaled on bar $c$, and arranged to roll from side to side between the bars $e'$ $e^2$ of beam $e$, as shown in Fig. 3. The lower periphery of the roller projects through the slot $e^4$, and the upper plate, $e'$, of beam $e$ bears on the roller. By this means I provide a support for the outer end of beam $e$—one that will be secure and will permit the moving of the steering-bar $c$ back and forth, and also the slight lateral motion of the said bar, as indicated in dotted lines, Fig. 2. I preferably construct the beam e of a plate of metal having its opposite ends bent together, forming the upper and lower bars, e′ e², and placing a block of wood between the bent portion. This beam, if so desired, may be constructed all of metal.

g is a windlass journaled in a bracket secured to standards supporting the driver's seat, and arranged at right angles to the cord c′, and having the crank g′ arranged alongside and in easy reach of the operator. The cord c′ is passed around this windlass and drawn taut and secured to the upturned ends of bar c. Thus as the crank is turned one way or another the bar c is thrown back or forward, turning the velocipede to right or left, as is desired.

Instead of using the cord c′, a chain might be employed where it would be desirable to use a sprocket-wheel instead of the windlass g. I prefer, however, the construction shown.

Having thus described my invention, what I claim, and desire to secure by Letters Patent, is—

1. The combination, substantially as hereinbefore described, of the axle a, the rods b b′, bracket b², and steering-bar c, as and for the purposes set forth.

2. The combination of the rods b b′, bracket b², bar c, cord c′, and windlass g, substantially as set forth.

3. The combination, with the rods b and bar c, of the seat d, supported on standards secured to rod b and beam e, and the beam e and roller f, substantially as set forth.

4. The combination, with the rod b and bar c, of the beam e, having one end pivoted on rod c and its opposite end bifurcated and supported on roller f, substantially as set forth.

In testimony that I claim the foregoing as my own I affix my signature in presence of two witnesses.

BENJAMIN F. TREKELL.

Witnesses:
H. McCLURE,
CLAY B. WHITFORD.